United States Patent [19]

Yoshida et al.

[11] Patent Number: 5,227,608

[45] Date of Patent: Jul. 13, 1993

[54] LASER ABLATION APPARATUS

[75] Inventors: Yoshikazu Yoshida, Izumi; Yukio Nishikawa, Ikeda; Kunio Tanaka, Toyonaka, all of Japan

[73] Assignee: Matsuhita Electric Industrial Co., Ltd., Kadoma, Japan

[21] Appl. No.: 922,768

[22] Filed: Jul. 31, 1992

[51] Int. Cl.⁵ .............................................. B23K 26/00
[52] U.S. Cl. ........................... 219/121.68; 219/121.76; 219/121.84; 219/121.86
[58] Field of Search ........................ 219/121.68, 121.69, 219/121.76, 121.84, 121.86; 427/53.1

[56] References Cited

U.S. PATENT DOCUMENTS 5,017,277  5/1991  Yoshida et al. ........................ 204/298

Primary Examiner—C. L. Albritton

Attorney, Agent, or Firm—Wenderoth, Lind & Ponack

[57] ABSTRACT

A laser ablation apparatus includes a laser beam source for ablation for emitting a first laser beam, a lens for focusing the first laser beam, a vacuum chamber having a window on its wall through which the first laser beam is injected into the vacuum chamber, a target holder arranged in the vacuum chamber to hold a target onto which the first laser beam is irradiated, a substrate holder arranged opposing to the target holder in the vacuum chamber to hold a substrate, and a laser beam source for particle decomposition for emitting a second laser beam in the vacuum chamber to decompose particles turned out from the target by the first laser beam in the vacuum chamber. The apparatus can further include a pair of mirrors, arranged on both sides of the target holder, for multiply reflecting the second laser beam over the target holder.

7 Claims, 4 Drawing Sheets

50μm

LASER ABLATION APPARATUS

BACKGROUND OF THE INVENTION

The present invention relates to a laser ablation apparatus used for film formation of a superconductor or a ferroelectrics utilized in a thin film device.

One example of a conventional laser ablation apparatus will be explained below.

In the conventional laser ablation apparatus, as shown in FIG. 2, a laser beam 2 having the energy density not less than a threshold value is irradiated on an object 7 to be processed located in a vacuum chamber 5 to fly substance such as particles 19 out from the object 7 and then adhere the substance 19 to a substrate 15 supported by a substrate holder 14. The laser beam 2 is normally irradiated on the object 7 by focusing a short-wavelength pulsed laser beam with high energy density. The laser beam is focused by a lens 3 through a vacuum sealing window 4 onto the object 7. The air in the vacuum chamber 5 is exhausted by a vacuum pump 6.

In such an apparatus, however, parts of the object 7 is heated to high temperature in a short period of time, and then clusters 20 not more than several micron (which is normally called as droplets) are flown out from the object 7. Then, since such clusters 20 are mingled in a thin film formed on the substrate 15, it is difficult to make the thin film flat which is basically required in a thin film device.

SUMMARY OF THE INVENTION

Accordingly, an object of the present invention is to provide a laser ablation apparatus capable of forming a flat thin film.

In accomplishing these and other objects, according to one aspect of the present invention, there is provided a laser ablation apparatus comprising:

a laser beam source for ablation for emitting a first laser beam;

a lens for focusing the first laser beam;

a vacuum chamber having a window on its wall through which the first laser beam is injected into the vacuum chamber;

a target holder arranged in the vacuum chamber to hold a target onto which the first laser beam is irradiated;

a substrate holder arranged opposing to the target holder in the vacuum chamber to hold a substrate; and a laser beam source for particle decomposition for emitting a second laser beam in the vacuum chamber to decompose particles turned out from the target by the first laser beam in the vacuum chamber.

By the above construction of the present invention, by injecting the laser beam into the vacuum chamber, the laser beam can be effectively absorbed in the ablation particles including the droplets turned out from the target, and the droplets can be heated and evaporated effectively, and then the droplets can be sufficiently decomposed. Thus, the sizes of the droplets mingled in the thin film adhered onto the substrate can become smaller, resulting in forming a flat thin film.

According to another aspect of the present invention, there is provided a laser ablation apparatus comprising:

a laser beam source for ablation for emitting a first laser beam;

a lens for focusing the first laser beam;

a vacuum chamber having a window on its wall through which the first laser beam is injected into the vacuum chamber;

a target holder arranged in the vacuum chamber to hold a target onto which the first laser beam is irradiated;

a substrate holder arranged opposing to the target holder in the vacuum chamber to hold a substrate;

a laser beam source for particle decomposition for emitting a second laser beam in the vacuum chamber decompose particles turned out from the target by the first laser beam in the vacuum chamber; and a pair of mirrors, arranged on both sides of the target holder, for multiply reflecting the second laser beam over the target holder.

By the above construction of the present invention, by multiply reflecting the laser beam over the target holder, the laser beam can be effectively absorbed in the ablation particles including the droplets turned out from the target, and the droplets can be heated and evaporated effectively, and then the droplets can be sufficiently decomposed. Thus, the sizes of the droplets mingled in the thin film adhered onto the substrate can become one tenth or less, resulting in forming a flat thin film.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
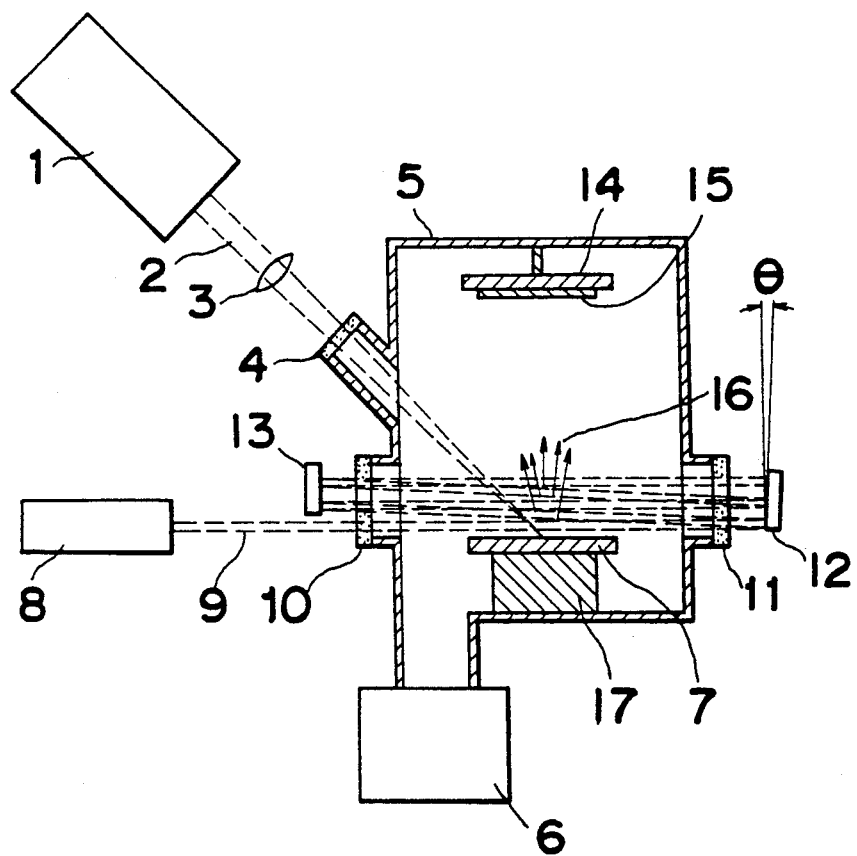
FIG. 1 is a sectional view showing a laser ablation apparatus according to one embodiment of the present invention.
Figure 2:
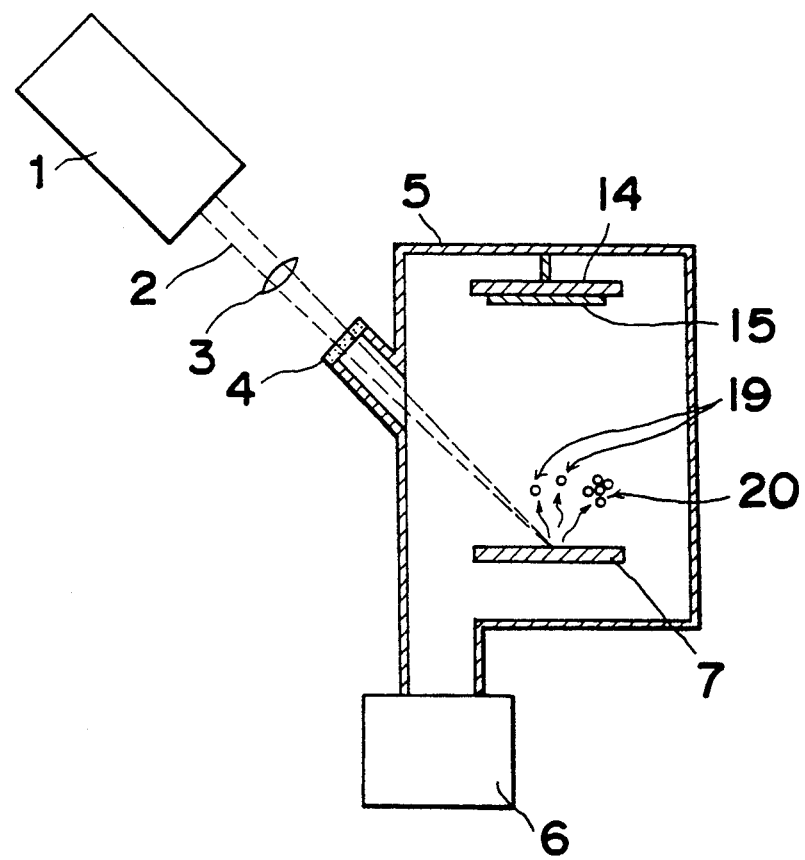
FIG. 2 is a sectional view showing a conventional laser ablation apparatus.

Before the description of the present invention proceeds, it is to be noted that like parts are designated by like reference numerals throughout the accompanying drawings.

A laser ablation apparatus according to one preferred embodiment of the present invention is shown in FIG. 1. A laser beam 2 for ablation oscillated from an excimer laser is focused by a lens 3 through a vacuum sealing window 4 provided on the vacuum chamber wall onto a target 7 in a vacuum chamber 5. The laser beam 2 is irradiated on the target 7 movably supported by an X-Y table 17 in the vacuum chamber 5. The target 7 can move in an x-direction (a traverse direction in FIG. 1) and a y-direction (a direction perpendicular to a sheet of the drawing in FIG. 1) by the X-Y table 17 in the vacuum chamber 5. The vacuum chamber 5 has a vacuum pump 6 for exhausting air in the chamber 5. A laser beam 9 for decomposing particles oscillated from a YAG laser 8 passes through a vacuum sealing window 10 provided on the vacuum chamber wall to inject in the vacuum chamber 5 passes over the target 7 in parallel with the surface of the target 7, and then passes through a vacuum sealing window 11 opposed to the vacuum sealing window 10 and provided on the vacuum chamber wall to travel to the outside of the vacuum chamber 5. A laser reflection mirror 12 is arranged outside the vacuum sealing window 11 to reflect the laser beam 9. The laser reflection mirror 12 is slightly, e.g. by 0.5 degree, inclined to a vertical direction in FIG. 1, that is, to a direction perpendicular to the surface of the target. Another laser reflection mirror 13 is arranged outside the vacuum sealing window 10 to reflect the laser beam 9 reflected by the mirror 12. Therefore, the laser beam 9 is multiply reflected over the target 7 between the mirrors 12 and 13 through the vacuum sealing windows 11 and 10 so as to decompose the droplets flown out from the target 7. An initial path of the laser beam 9 injected in the vacuum chamber 5 is, preferably, below multiple paths reflected by the mirrors 12 and 13 and over the target 7. A substrate holder 14 is arranged opposing to the target 7 in the vacuum chamber 5 and supports a substrate 15.

According to the construction, the substance of the target 7 is turned out therefrom by a 20 nsec-pulsed laser beam 2, for example and then the substance fly as particles 16 to the substrate 15 to form a thin film on the substrate 15. At that time, a 300 nsec-pulsed laser beam 9 as one example is injected in a space apart from the target 7 by 5 mm in the vacuum chamber 5 in 1 μsec after the oscillation of the laser beam 2. When the distance between the mirrors 12 and 13 is 300 mm and the inclined angle ($\theta$) of the mirror 12 is 0.5 degree as one example, the laser beam 9 multiply reflected between the mirrors 12 and 13 is absorbed by the particles 16 and droplets during the flight paths of the turned-out particles 16 and droplets. Therefore, heat is supplied to the flying particles 16 and droplets from the laser beam 9 and then the evaporation speed of the droplets becomes faster and the droplets can be sufficiently decomposed to make the sizes of the droplets one tenth or less which will be mingled in a thin film.

Instead of the pulse oscillation, the laser beam source 8 can be performed by the continuous oscillation to have the same advantages.

According to the apparatus of the embodiment, by multiply reflecting the laser beam 9 over the target 7, the laser beam 9 can be effectively absorbed in the ablation particles 16 including the droplets turned out from the target 7, and the droplets can be heated and evaporated effectively, and then the droplets can be sufficiently decomposed. Thus, the sizes of the droplets mingled in the thin film adhered onto the substrate 15 can become one tenth or less, resulting in forming a flat thin film.

In the above construction of the embodiment, if the laser beam 9 is injected over the target 7 without the reflection of the mirrors 12 and 13, by injecting the laser beam 9 into the vacuum chamber 5, the laser beam 9 can be effectively absorbed in the ablation particles 16 including the droplets turned out from the target 7, and the droplets can be heated and evaporated effectively, and then the droplets can be sufficiently decomposed. Thus, the sizes of the droplets mingled in the thin film adhered onto the substrate 15 can become smaller, resulting in forming a flat thin film.

Figure 3A:
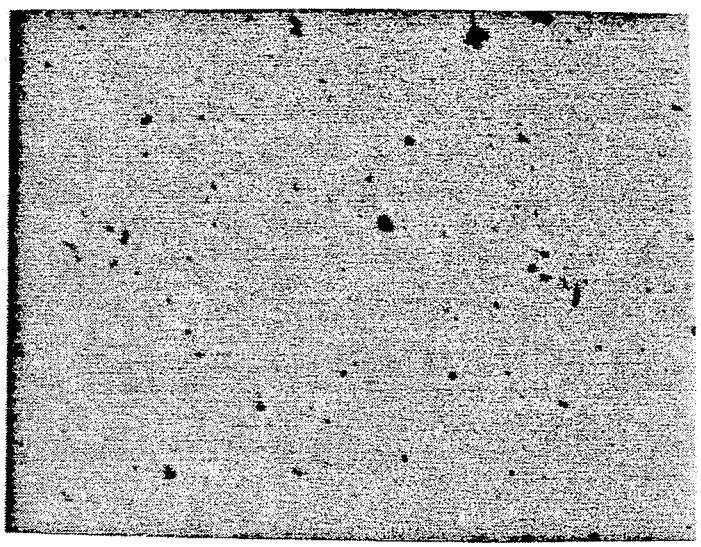
FIGS. 3A and 3B are respectively a photograph and a schematic view showing a first experiment in which a laser beam is injected on a target at 45 degree.
Figure 4A:
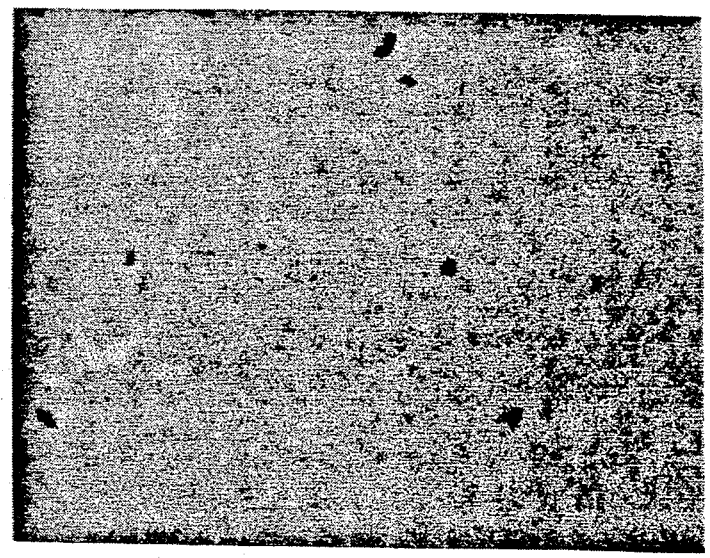
FIGS. 4A and 4B are respectively a photograph and a schematic view showing a second experiment in which a laser beam is injected on a target at 90 degree.
Figure 3B:
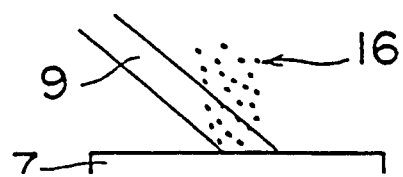
Figure 4B:
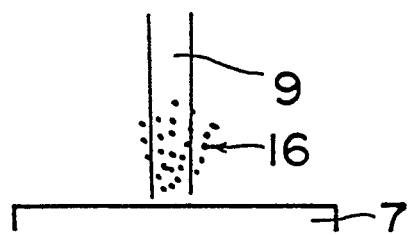

FIGS. 3A, 3B, 4A, and 4B show experiments according to the embodiment in which 27 sec-pulsed laser beams emitted from 248 nm-KrF excimer lasers are absorbed in particles over targets. In FIG. 3A, the inclined angle of the laser beam to the surface of the target is 45 degree as shown in FIG. 3B. In FIG. 4A, the inclined angle of the laser beam to the surface of the target is 90 degree as shown in FIG. 4B. As is clear from the experiments, the sizes of the droplets in FIGS. 4A and 4B can become smaller than that in FIGS. 3A and 3B because the laser beam is effectively absorbed in particles in FIGS. 4A and 4B compared with in FIGS. 3A and 3B. Thus, it is preferably to multiply reflect the laser beam 9 over the target 7 by the mirrors 12 and 13 for effective absorption.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser ablation apparatus comprising:
   a laser beam source for ablation for emitting a first laser beam;
   a lens for focusing the first laser beam;
   a vacuum chamber having a window on its wall through which the first laser beam is injected into the vacuum chamber;
   a target holder arranged in the vacuum chamber to hold a target onto which the first laser beam is irradiated;
   a substrate holder arranged opposing to the target holder in the vacuum chamber to hold a substrate; and
   a laser beam source for particle decomposition for emitting a second laser beam in the vacuum chamber to decompose particles turned out from the target by the first laser beam in the vacuum chamber.

2. The laser ablation apparatus as claimed in claim 1, wherein the second beam is injected in approximately parallel with a surface of the target into the vacuum chamber.

3. The laser ablation apparatus as claimed in claim 1, wherein the laser beam source for ablation and the laser beam source for particle decomposition synchronously emit pulsed laser beams.

4. The laser ablation apparatus as claimed in claim 1, wherein the laser beam source for particle decomposition continuously emits the second laser beam.

5. A laser ablation apparatus comprising:
   a laser beam source for ablation for emitting a first laser beam;
   a lens for focusing the first laser beam;
   a vacuum chamber having a window on its wall through which the first laser beam is injected into the vacuum chamber;
   a target holder arranged in the vacuum chamber to hold a target onto which the first laser beam is irradiated;
   a substrate holder arranged opposing to the target holder in the vacuum chamber to hold a substrate;
   a laser beam source for particle decomposition for emitting a second laser beam in the vacuum chamber decompose particles turned out from the target by the first laser beam in the vacuum chamber; and
   a pair of mirrors, arranged on both sides of the target holder, for multiply reflecting the second laser beam over the target holder.

6. The laser ablation apparatus as claimed in claim 5, wherein one of the mirror is inclined by 0.5 degree to a direction perpendicular to a surface of the target.

7. The laser ablation apparatus as claimed in claim 5, wherein an initial path of the second laser beam injected in the vacuum chamber is below multiple paths reflected by the mirrors and over the target.

* * * * *

UNITED STATES PATENT AND TRADEMARK OFFICE
CERTIFICATE OF CORRECTION

PATENT NO. : 5,227,608

DATED : July 13, 1993

INVENTOR(S) : Yoshikazu Yoshida, et al.

It is certified that error appears in the above-identified patent and that said Letters Patent is hereby corrected as shown below:

On the title page: Item

[73] for "Matsuhita" read --Matsushita--;

[30] Foreign Application Priority Data
August 9, 1991 [JP] Japan . . . 3-200596

Signed and Sealed this

Twenty-second Day of March, 1994

Attest:

BRUCE LEHMAN

*Attesting Officer*  *Commissioner of Patents and Trademarks*